Feb. 14, 1967  F. O. BOYLES  3,303,820
AUTOMATIC DEVICE FOR CASTING SIMULATED BIRDS
Filed June 24, 1965  3 Sheets-Sheet 1

INVENTOR
Fred O. Boyles

BY  *Cecil L. Wood*

ATTORNEY

INVENTOR
Fred O. Boyles
BY Cecil E. Rood
ATTORNEY

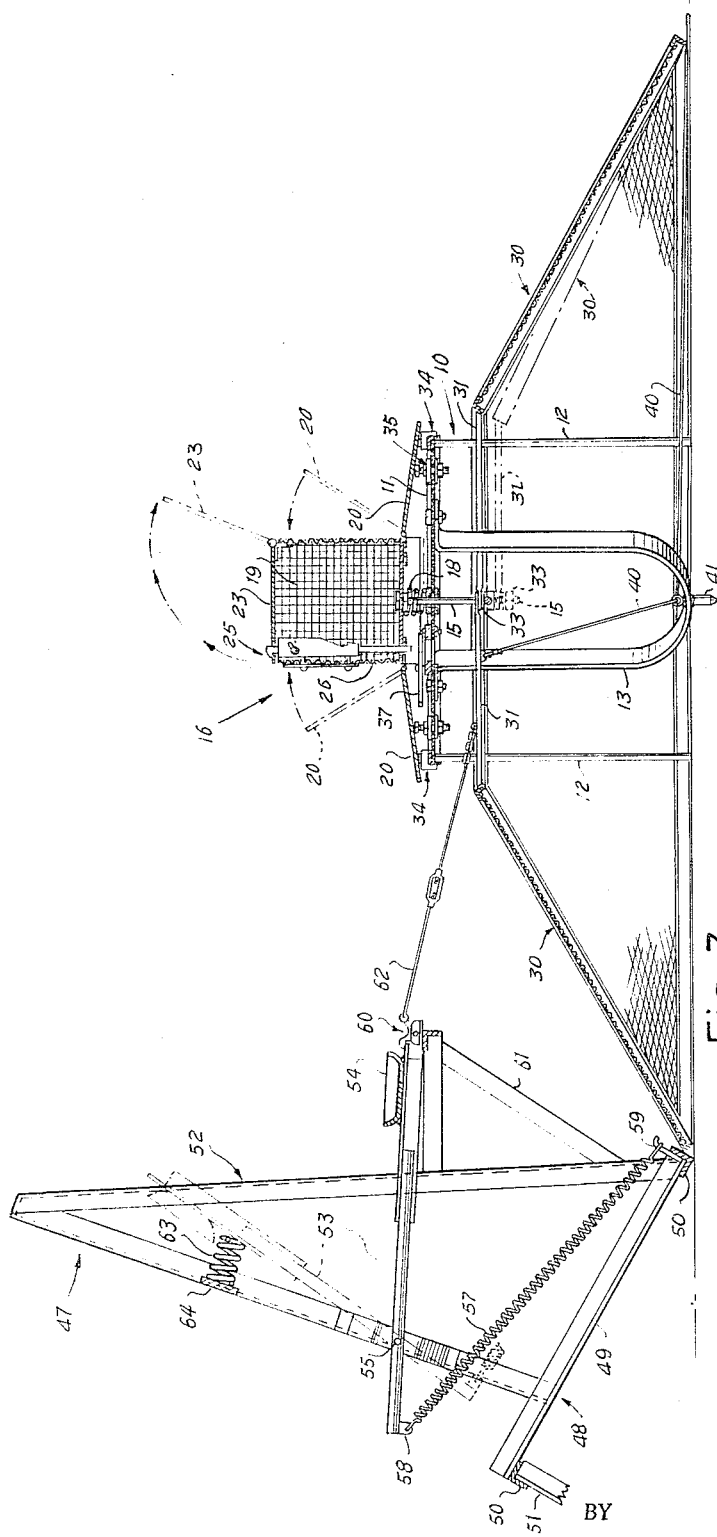
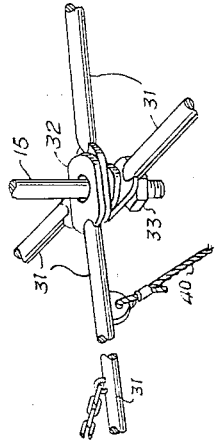
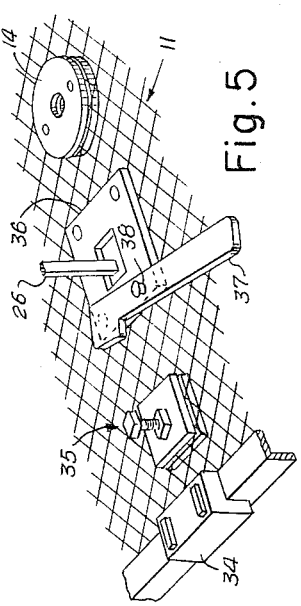

_United States Patent Office_

3,303,820
Patented Feb. 14, 1967

3,303,820
AUTOMATIC DEVICE FOR CASTING
SIMULATED BIRDS
Fred O. Boyles, 2412 Queensbury Road,
Moore, Okla. 73060
Filed June 24, 1965, Ser. No. 466,562
5 Claims. (Cl. 119—15.6)

This invention relates to a bird simulator, and it has particular reference to an animated mechanical target device designed to simulate actual bird hunting conditions in small areas, for use in teaching and training bird dogs, and for controlled field trials under conditions simulating actual hunting conditions.

A good bird dog is the product of training and experience as well as heredity, and much patience and skill ordinarily are required, beginning when a dog is comparatively young, first to teach the dog simple acts of obedience and confidence in his trainer, and thereafter, to teach him the fine art of hunting and to be alert and prepared for the unexpected at all times. The dog usually is first instructed in small areas, as in the yard of the trainer's home, and thereafter, when he has mastered the more elementary functions, he is taken on controlled field trials. Finally he is ready for the actual hunt, and by continued practice and experience, after many hunts, he becomes more valuable as a hunting dog.

A prime object of the invention is that of providing an animated mechanical target device which in use is characterized by its realistic action and which advantageously may be employed for simulating actual bird hunting conditions in small areas, for use in training bird dogs by actual practice and instruction under such simulated conditions, and for controlled field trials under conditions simulating actual hunting conditions.

A further object of the invention resides in the provision of an animated mechanical target device as described having a variable action and which may be preset to operate, as triggered either by the dog or his trainer, as desired, in several different ways, and combinations thereof, as selected, simulating the sudden, unpredictable action of a covey of scattered quail at the moment of flushing.

Broadly, the invention contemplates the provision of an animated mechanical target device as described which is of simple, light weight construction and which may be readily set up in the field and thereafter disassembled for convenience in transporting and storing when not in use, and is efficient in operation and durable in use and may be fabricated inexpensively.

While the foregoing objects are paramount, other and lesser objects will become apparent as the description proceeds, when considered in connection with the appended drawings wherein:

FIGURE 1 is a perspective view of an animated mechanical target device embodying the invention as seen from the top and two adjacent sides thereof, showing the depressible bird cage, adapted to contain a live bird, in its uppermost position, in which the opaque spring biased, hinged false sides thereof are folded downwardly and laterally outwardly to expose a live bird in said cage, showing the opaque spring biased, hinged top cover of said cage in its closed and latched position, and showing the spring biased, pivotally movable throwing arm of the catapult, adapted to throw a dummy bird, in its latched position preparatory to throwing.

FIGURE 3 is a sectional elevational view taken on the line 3—3 of FIGURE 2.

FIGURES 5, 6, 7, and 8 are fragmentary views on an enlarged scale showing details of construction.

The invention, in its preferred form, includes a central table, designated generally by the numeral 10, which is generally rectangular and has an open screen top 11 and four removable legs 12 whereby it is supported at its corners. The table 10 is additionally supported by a substantially U shaped brace 13 which is arranged diagonally relative to the table top 11 and has its opposite ends removably connected to the table top 11 and depends therefrom for abutting engagement with a supporting surface, such as the ground.

Figure 4:
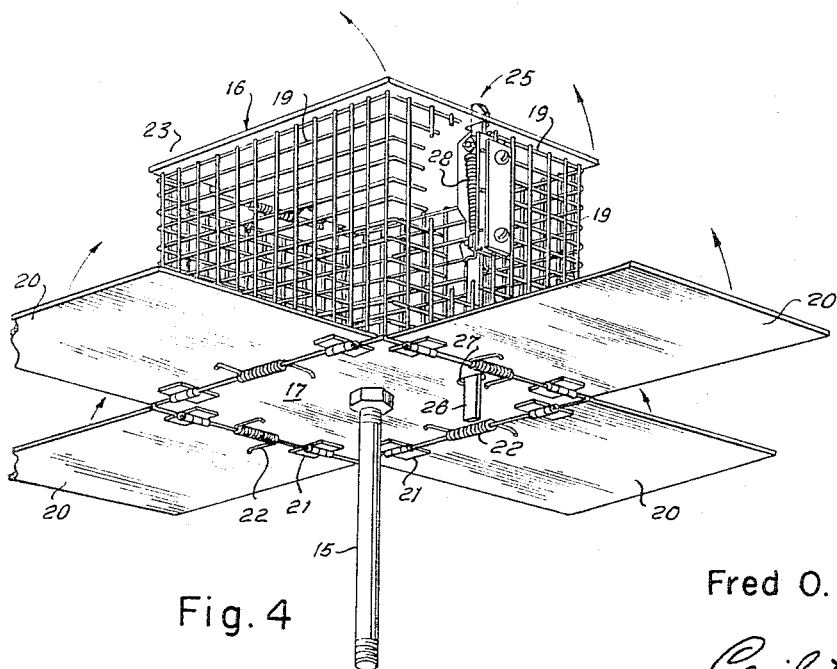
FIGURE 4 is a fragmentary perspective view on an enlarged scale, showing the bird cage and its opaque spring biased, hinged false sides illustrated in FIGURE 1 as seen from the under side, showing the depending central pin whereby said cage is centered relative to the central supporting table on which it is yieldably supported.
Figure 2:
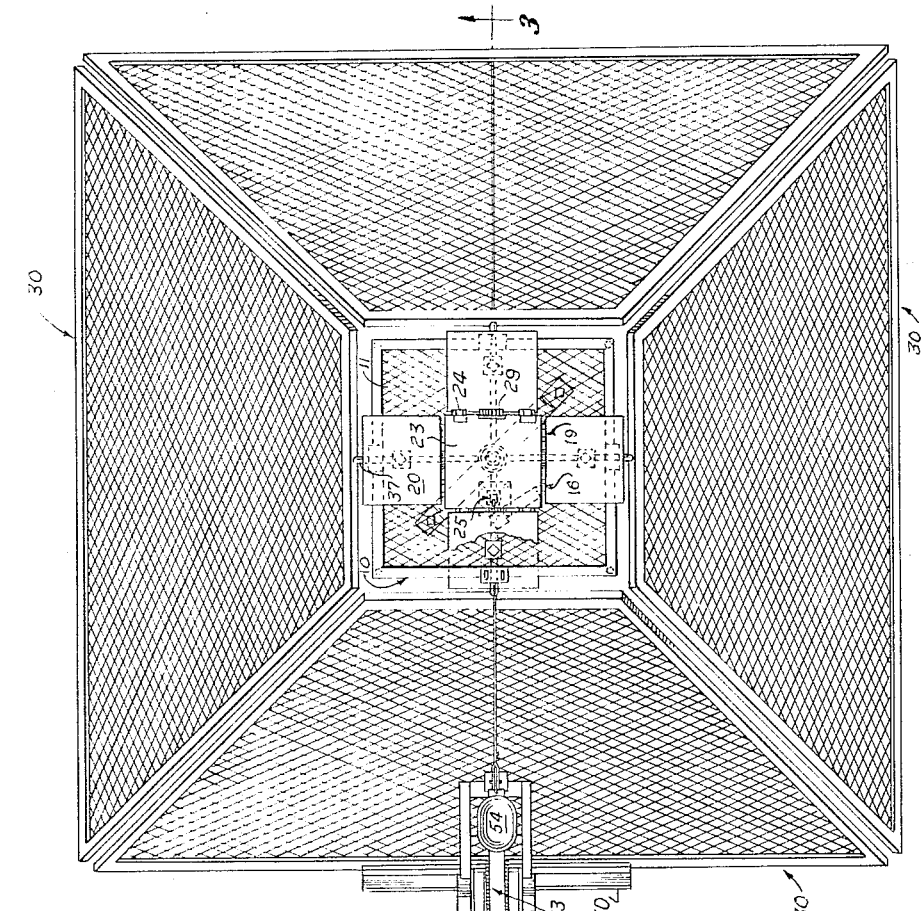
FIGURE 2 is a top plan view of the device as shown in FIGURE 1.

As shown best in FIGURES 4 and 5, the open screen table top 11 has an annular reinforcement 14 centrally thereof for sliding engagement by a pin 15 which is movable reciprocally in a vertical direction relative thereto. A bird cage as hereinafter described, which is adapted to contain a live bird and is indicated generally by the numeral 16, has its bottom 17, which is opaque, removably connected to the upper end of the pin 15 and is movable therewith relative to the table top 11. As shown in FIGURE 3, a compression spring 18, which surrounds the pin 15, acts upon the table top 11 and the bottom 17 of the cage 16 to bias the cage 16 upwardly relative to the table top 11.

The cage 16 is generally rectangular and has open screen sides 19, and has opaque false sides 20 which are connected by hinges 21 at their lower edges whereby they are movable about the hinges 21 from a closed position, in which they are folded upwardly about the open screen sides 19 to conceal a live bird in the cage 16, to an open position in which they are folded downwardly and laterally outwardly as shown in FIGURE 4. The false sides 20 are biased in their closed positions by springs 22.

The cage 16 has an opaque top cover 23 which is connected by hinges 24 at one side thereof and has its opposite side secured by a latch, indicated generally by the numeral 25, having a vertically disposed, reciprocally movable elongated latch element 26 on one of the open screen sides 19 which extends downwardly through an opening therefor in the bottom 17 of the cage 16, as at 27, and is biased in a downward direction by a tension spring 28 whereby the top cover 23 is secured in its closed and latched position. The top cover is biased in its open position, upon disengaging the latch 25, by a spring 29.

The table 10 is surrounded by a generally rectangular enclosure which is formed by a plurality of four open screen panels, indicated generally by the numerals 30, each corresponding to one side of the table 10, which are adapted to have one of their longitudinal edges in engagement with a supporting surface, such as the ground, and are inclined upwardly and laterally inwardly in the direction of the table 10. The panels 30 are connected only as hereinafter described, and are movable relative to the table 10 and relative to each other.

The open screen panels 30, each of which is operable as a trigger element as hereinafter described, each have a link 31 rigidly connected at one end to the longitudinal edge thereof opposite said one of its longitudinal edges. The respective links 31 extend laterally inwardly in the direction of each other, and the adjacent ends thereof, which overlap, have eyes 32 therein which loosely surround the pin 15, below the table top 11. The pin 15 has a nut 33 on its lower end, as shown in FIGURE 6, below the eyes 32 of the links 31, whereby the pin 15 and the cage 16 are adapted to be depressed relative to the table top 11 upon selectively depressing the open screen panels 30.

The opaque false sides 20 of the cage 16 are secured in their open positions, in which they extend laterally outwardly from the cage 16, as shown in FIGURE 4, in the uppermost position of the pin 15 and the cage 16 relative to the table top 11, by a plurality of individual magnets 34, as shown in FIGURE 5, on the peripheral edge of the table top 11.

A plurality of upstanding abutments 35 on the table top 11, which are formed in part by vertically adjustable screws, are engageable with the respective false sides 20 of the cage 16, in the lowermost position of the pin 15 and the cage 16 relative to the table top 11, whereby the false sides 20 are disengaged from the magnets 34, and are folded upwardly about the open screen sides 19 of the cage 16 by the action of the springs 22.

As shown best in FIGURE 5, the table top 11 has a reinforced opening 36 through which the elongated latch element 26 is passed in its lowermost position relative to the cage 16 and in the lowermost position of the pin 15 and the cage 16 relative to the tabletop 11, whereby the top cover 23 is secured in its closed and latched position by the action of the spring 28.

A lever 37, which is pivotally connected intermediate its ends, as at 38, to a reinforced marginal portion of the table top 11 surrounding the opening 36, has one of its end portions movable in and out of abutting engagement with the lower end of the latch element 26, upon downward movement of the latch element 26 with the pin 15 and the cage 16 relative to the table top 11, in response to pivotal adjustment of the lever 37 about its pivot 38. The arrangement is such that the opening 36 is substantially closed in one position of the lever 37, whereby the latch element 26 may be raised relative to the cage 16, to thereby disengage it from the top cover 23, by abutting engagement of the latch element 26 with the lever 37 upon downward movement of the pin 15 and the cage 16 relative to the table top 11, whereby the top cover 23 is raised to open the cage 16 and release a live bird therefrom by the action of the spring 29.

Figures 7, 8:
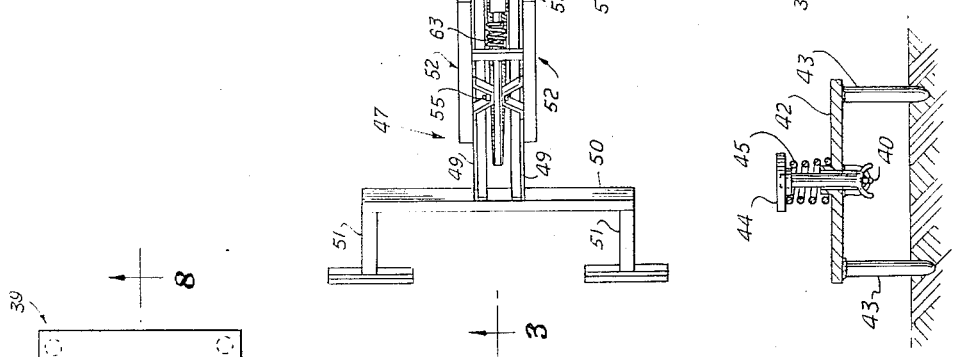

A foot operable trigger device, shown on an enlarged scale in FIGURES 7 and 8 and designated generally by the numeral 39, is positioned at a distance from the structure above described and has a flexible link 40 leading therefrom to one of the links 31, to which it is connected, whereby the pin 15 and the cage 16 are adapted to be depressed relative to the table top 11 by pulling the flexible link 40, which is passed under one of the panels 30 and through an eye in one end of a stake 41 adapted to be driven in the ground within the enclosure formed by the panels 30.

As shown in FIGURES 7 and 8, the trigger device 39 consists of a small rectangular platform 42 having supporting legs 43 at its corners adapted to be driven in the ground. A plunger 44, which extends vertically through a central opening therefor in the platform 42 and is biased upwardly by a compression spring 45, bears downwardly against the flexible link 40, which extends across the under side of the platform 42 and has one of its ends connected thereto, as at 46.

The arrangement is such that the link 40 is adapted to be pulled, to thereby depress the pin 15 and the cage 16 relative to the table top 11 as above described, upon downward movement of the plunger 44, whereby the false sides 20 are disengaged from the magnets 34 and folded upwardly about the open screen sides 19 of the cage 16 to conceal a live bird therein, and at the same time the cover 23 may be opened as above described to release the bird, depending on the setting of the lever 37.

A catapult as hereinafter described, designated generally by the numeral 47, is positioned on one side of the enclosure formed by the panels 30. The catapult 47 has a frame, indicated generally by the numeral 48, which includes an upwardly and forwardly inclined base consisting of a pair of longitudinally extending elongated structural members 49, which are connected at their ends by a pair of transverse members 50. A pair of legs 51, are removably connected to the front base member 50 whereby the base is supported in its inclined position. The frame 48 further includes a pair of upstanding A frames 52, on opposite sides thereof, which are supported on the base and connected in spaced apart relation to each other as hereinafter described.

A throwing arm 53, which has a receptacle 54 on one of its ends adapted to receive a dummy bird which is intended to be thrown, is pivotally connected intermediate its ends, as at 55, between a pair of mutually opposing brackets 56, on the respective A frames 52, forwardly thereof. A tension spring 57 has one of its ends connected to the forward end of the throwing arm 53, as at 58, and has its opposite end anchored, as at 59, to the rear base member 50.

The rearward end of the throwing arm 53 is secured by a latch 60 to a bracket, indicated generally by the numeral 61, which is connected between the A frames 52 rearwardly thereof. The latch 60 is connected by flexible and adjustable linkage 62, which as shown consists of a turnbuckle having a chain connected to one of its ends, to one of the links 31 whereby the throwing arm 53 is adapted to be released, to throw the dummy bird, simultaneously with the downward movement of the pin 15 and the cage 16 relative to the table top 11.

A compression spring 63, which is connected to a cross brace 64 extending between the A frames 52, forwardly thereof, above the throwing arm 53, faces rearwardly and is operable as a recoil spring, for abutting engagement with the throwing arm 53 in its uppermost position, after it has been released.

Figure 1:
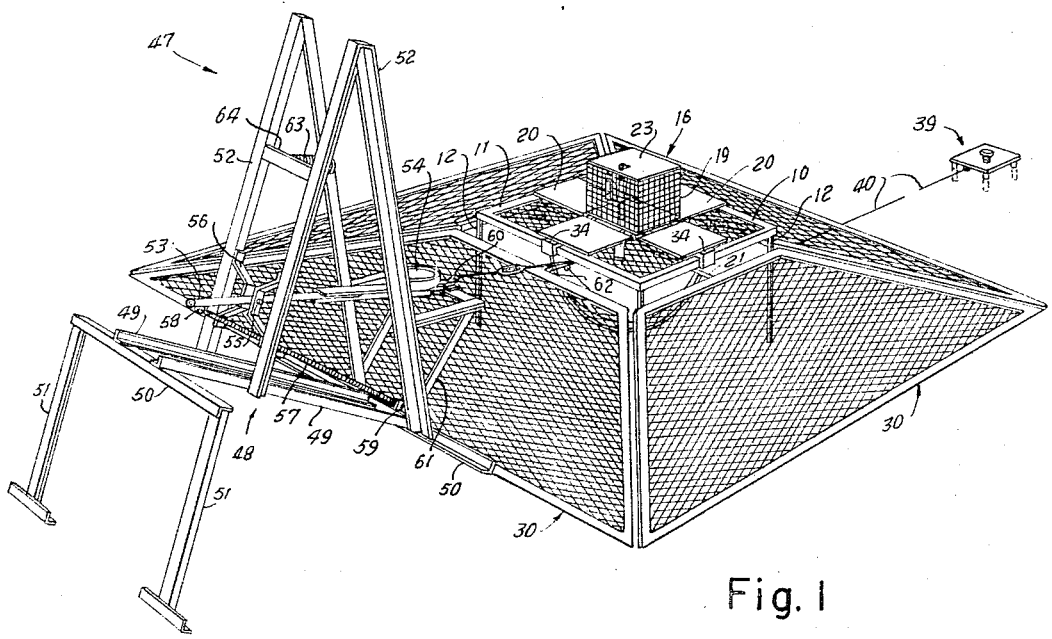

In operation, a live bird is placed in the cage 16 and the closure 23 latched. The closure elements 20 are in their closed positions under the influence of the springs 22. The members 20 are then folded outwardly and downwardly to engage the magnets 34 where they are held in their open positions, as shown in FIGURES 1, 3 and 4. The catapult arm 53 in "cocked" to the position shown in FIGURES 1 and 3 and secured by the latch 60. A dummy bird is placed in the receptacle 54. Only a relatively slight pressure, as by the paws of a dog applied to any one of the inclined panels 30, will lower the cage 16, against tension of the spring 18, through the linkage assembly shown in FIGURE 6 which includes the links 31 rigid with the panels 30, to release the latch 25 and permit the cover 23 of the cage 16 to be opened under the tension of the spring 29 to release the live bird from the cage 16. Meanwhile, and simultaneously, the catapult arm 53 is released to cast the dummy bird to cause the dog to pursue and attempt to retrieve it. The arm 53 is released by the cable 62 which is attached to one of the links 31, as depicted in FIGURES 3 and 6.

The sudden closing of the cage 16, by the release of the closure elements 20 from their detention magnets 34 to close the cage 16, will distract the dog and direct his attention to the dummy bird in flight from the catapult arm 53, the latter assuming the position shown in dotted lines in FIGURE 3.

When it is desired to release the live bird from the cage 16 without depressing one of the inclined panels 30, or by remote operation, the operator can depress the plunger 44, shown in FIGURES 1, 7 and 8 whereby, through the cable 40 attached to one of the members 31, the cage 16 is lowered to release the side covers 20 from their magnets 34 and, at the same time, the catapult arm 53 is released.

To prevent the top cover 23 of the cage 16 from becoming unlatched, if it is so desired, the lever 37 is actuated to the position shown in FIGURE 5 to uncover the opening 27 in the table top 11 to permit the plunger of the latch element 26 to enter the opening 27 thus preventing its being moved upwardly to release the cover 23. The invention may be modified within certain limitations, by persons skilled in the art, without departing from the spirit and intent thereof or the scope of the appended claims.

What is claimed is:

1. In an animated mechanical target device designed to simulate actual quail hunting conditions in small areas, for use in teaching and training bird dogs, and for controlled field trials under conditions simulating actual hunting conditions, the combination of a central table having an open screen top, said table top having an annular reinforced opening therein, centrally thereof, a vertically disposed pin slidably engaging said reinforced opening and movable reciprocally relative to said table top, a rectangular live bird cage above said table having open screen sides and having an opaque bottom removably connected to the upper end of said pin, resilient means surrounding said pin, between said table top and the bottom of said cage, acting on said cage to bias it upwardly relative to said table top, said cage having opaque false sides hinged thereto adjacent the bottom thereof and having individual springs acting thereon whereby said false sides are biased upwardly about said open screen sides to conceal a bird in said cage, individual magnets on said table top engageable with the upper edges of said false sides in their laterally outwardly extending positions relative to said cage, in the uppermost position of said cage relative to said table top, individual upstanding abutments on said table top engageable with said false sides intermediate their top and bottom edges, upon downward movement of said pin and said cage relative to said table top, whereby said false sides are disengaged from said magnets, and foot operable means, operable by the dog or his trainer, acting on said pin to move it downwardly relative to said table top.

2. The structure of claim 1, said foot operable means comprising a plurality of four open screen panels arranged about said table and forming between them an enclosure surrounding it, in substantially disconnected relation to said table and to each other, each of said panels extending substantially parallel to one of the sides of said table, in spaced apart relation thereto, and having one of its longitudinal edges resting upon a supporting surface, such as the ground, and being inclined upwardly and laterally inwardly in the direction of said table, each of said panels having a link rigidly connected to its upper edge and extending laterally inwardly below said table, each of said links having an eye thereon loosely surrounding said pin, and a nut on said pin, below said links.

3. The structure of claim 2, said cage having an opaque top cover hinged to one side thereof and having a spring acting thereon whereby it is biased upwardly to open it, and said cage having latch means normally securing said top cover in its closed and latched position, said latch means including a vertically disposed, reciprocally movable, elongated latch element on one side of said cage having a spring whereby it is biased downwardly relative to said cage to secure said top cover in its closed and latched position, said elongated latch element extending downwardly below said cage and through a reinforced opening therefor in said table top in the lowermost position of said pin and said cage relative to said table top, and a retractable abutment on said table top adapted, in one position thereof, to substantially close said last mentioned opening, for abutting engagement with the lower end of said elongated latch element upon downward movement of said elongated latch element with said cage, whereby said elongated latch element is moved upwardly relative to said cage to release said top cover.

4. The structure of claim 2, and other foot operable means, positioned at a distance from the enclosure formed by said panels, operable by the dog's trainer and having linkage connecting it to one of said links whereby said panels are connected to said pin below said table top.

5. The structure of claim 2, and a catapult positioned adjacent one side of said enclosure formed by said panels and arranged to throw a dummy bird, said catapult comprising a frame and a throwing arm pivotally connected intermediate its ends to said frame, and spring means acting on said throwing arm to move it about said pivotal connection, latch means on said frame acting on said throwing arm to secure it against movement about said pivotal connection, and linkage operatively connecting said latch means to said one of said links whereby said panels are connected to said pin, below said table top, whereby said throwing arm is released, to throw said dummy bird, simultaneously with the downward movement of said pin and said cage relative to said table top.

References Cited by the Examiner

UNITED STATES PATENTS

| | | | |
|---|---|---|---|
| 654,947 | 7/1900 | Champlin | 119—15.6 |
| 693,901 | 2/1902 | Portman | 119—15.6 |
| 3,063,412 | 11/1962 | Colsher et al. | 119—15.6 |
| 3,063,415 | 11/1962 | Chapman | 119—29 |

OTHER REFERENCES

Field and Stream (reprint), September 1948, "The Method of Scent and Illusion," (The Jackson Bird-Dog Trainer), pages 1, 2, 3, 3a, 3b, 3c and 4.

SAMUEL KOREN, *Primary Examiner.*

ALDRICH F. MEDBERY, *Examiner.*